United States Patent [19]

French

[11] Patent Number: 4,745,952
[45] Date of Patent: May 24, 1988

[54] STRUCTURE AND METHOD FOR HANDLING HAZARDOUS WASTE MATERIALS

[75] Inventor: Henry C. French, Knoxville, Tenn.

[73] Assignee: Dempster Systems Inc., Toccoa, Ga.

[21] Appl. No.: 4,896

[22] Filed: Jan. 20, 1987

[51] Int. Cl.⁴ .............................................. B65B 3/04
[52] U.S. Cl. .......................................... 141/1; 141/98;
  141/231; 141/89; 206/597; 410/35
[58] Field of Search ....................................... 141/1–12,
  141/237–248, 250–284, 98, 231, 232, 233, 89,
  90, 91, 92; 206/597, 430, 391, 392, 393, 394;
  410/35, 36, 42, 47, 48, 49

[56] References Cited

U.S. PATENT DOCUMENTS

| | | | |
|---|---|---|---|
| 2,730,249 | 1/1956 | Edwards | 214/75 |
| 2,763,383 | 9/1956 | McCoy | 214/75 |
| 3,572,513 | 3/1971 | Tantlinger et al. | 212/10 |
| 3,726,431 | 4/1973 | Botkin | 220/12 |
| 3,863,782 | 2/1975 | Sandrock | 214/75 |
| 4,023,694 | 5/1977 | Hawkins | 214/396 |
| 4,395,052 | 7/1983 | Rash | 280/5 |
| 4,542,774 | 9/1985 | Stavlo | 141/1 |

*Primary Examiner*—Houston S. Bell, Jr.
*Attorney, Agent, or Firm*—Jacox & Meckstroth

[57] ABSTRACT

A method and a structure for the handling of hazardous liquid wastes and for handling hazardous solid wastes. The method includes the positioning of hazardous waste container units at a site in which hazardous wastes are generated. The hazardous waste container units are filled with hazardous wastes at the generation site and removed from the generation site and transported to a site in which hazardous wastes are accumulated. The hazardous waste container units are emptied and cleaned for transport to the same hazardous waste generation site or to another hazardous waste generation site.

Hazardous waste container units which are constructed according to this invention include a rigid container. The rigid container is encompassed by a rigid frame. The rigid frame has lift engagement elements by which the hazardous waste container unit can be lifted. The frame of the hazardous waste container unit also has feet which include locking elements for locking the feet and the hazardous waste container unit upon the surface of a load support bed of a transport vehicle, such as a truck or the like. Thus, the hazardous waste container unit is firmly carried by the transport vehicle.

9 Claims, 4 Drawing Sheets

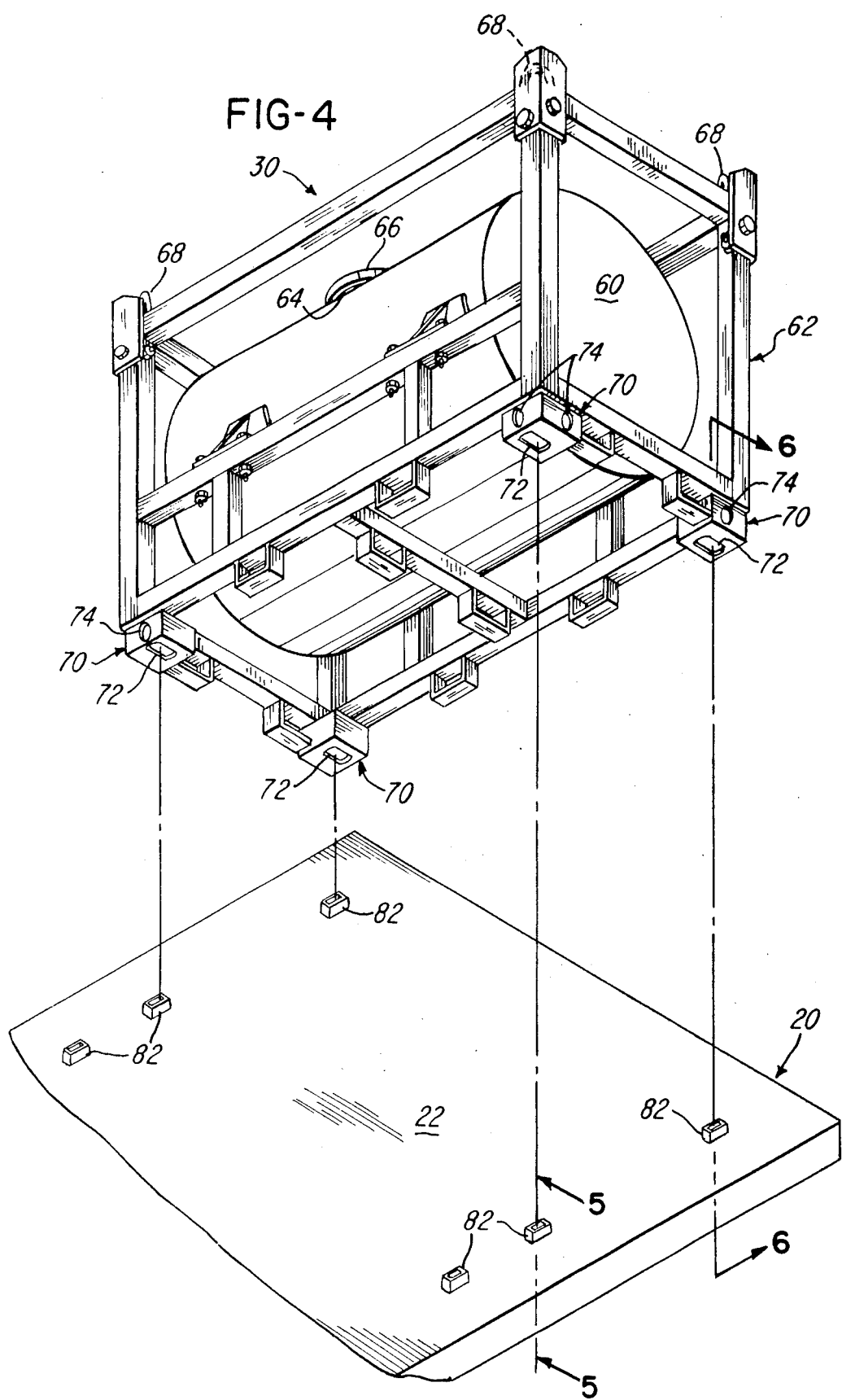

U.S. Patent   May 24, 1988   Sheet 4 of 4   4,745,952
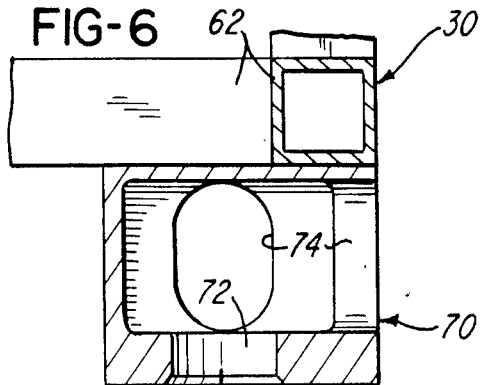
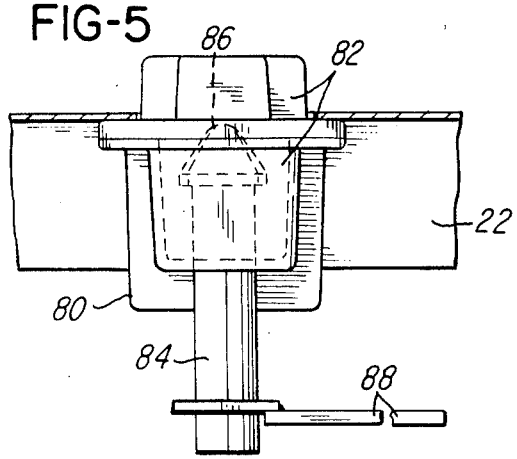
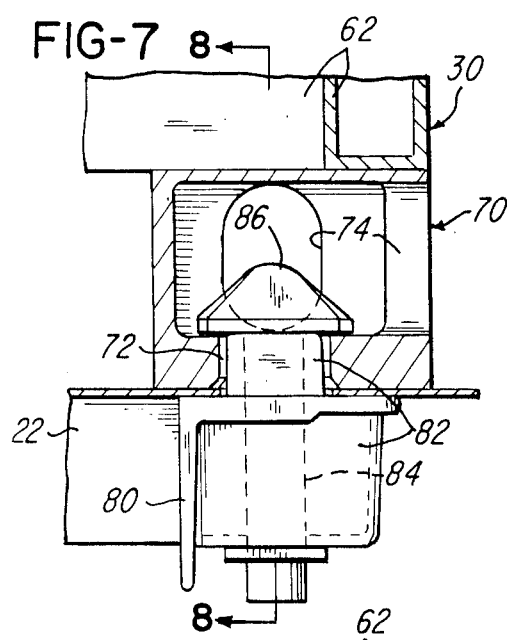
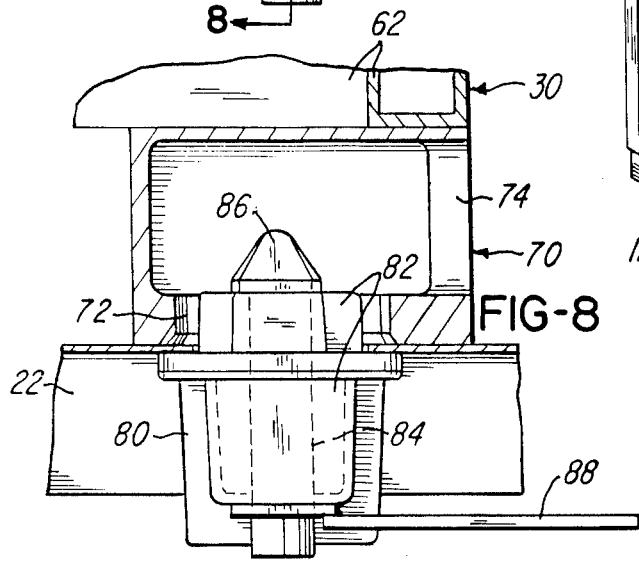
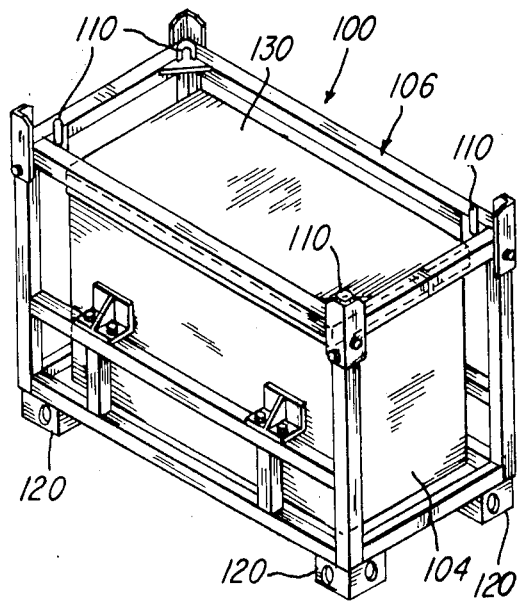

4,745,952

STRUCTURE AND METHOD FOR HANDLING HAZARDOUS WASTE MATERIALS

BACKGROUND OF THE INVENTION

Hazardous waste materials must be transported from the site at which they occur or at which they are generated to locations in which they are least likely to present problems to the public.

Conventionally, hazardous wastes are placed in steel drums. The steel drums may not be adapted or constructed to contain hazardous waste materials. A hauler picks up the drums and takes them to a staging area. The filled drums are stored at the staging area until a complete load of drums is accumulated. Then a load of the filled drums is taken to a disposal site. At the disposal site the drums are emptied and the contents thereof are disposed of, or the drums with the contents thereof are disposed of at a disposal site.

Another conventional method of handling hazardous liquid wastes is that in which a generator of the hazardous liquid wastes collects the hazardous liquid wastes and stores the hazardous liquid wastes in underground tanks. Haulers then pump the liquid wastes from the underground tanks into a tank type of vehicle. The liquid wastes are then taken by the tank vehicle to a staging area and deposited in holding tanks with other hazardous liquid wastes from various sources. Then the liquid wastes are transferred from the holding tanks to large volume tank trucks, and the wastes are taken to disposal sites at which they are disposed of.

An object of this invention is to provide structure and methods by which hazardous waste materials are readily and economically transferred from a site of generation of the wastes to a disposal site.

Another object of this invention is to provide a container unit which is specifically adapted for containing and transporting hazardous waste materials.

Another object of this invention is to provide a container unit which is adapted for containing and transporting hazardous liquid waste materials.

Another object of this invention is to provide a container unit which is adapted for containing and transporting hazardous solid waste materials.

Other objects and advantages of this invention reside in the construction of hazardous waste container units, the methods involved and the modes employed, as will become more apparent from the following description.

BRIEF DESCRIPTION OF THE VIEWS OF THE DRAWINGS

FIG. 4 is an enlarged perspective exploded view showing a hazardous liquid waste container unit made according to this invention. This figure also illustrates the mounting of the hazardous liquid waste container unit upon a load support bed of a carrier vehicle or the like.

FIG. 5 is an enlarged fragmentary sectional view taken substantially on line 5—5 of FIG. 4. This view shows locking mechanism of this invention in an unlocked position.

FIG. 6 is a fragmentary sectional view, drawn on substantially the same scale as FIG. 5, and taken substantially on line 6—6 of FIG. 4, showing the locking mechanism in an unlocked position. This view illustrates movement of a hazardous waste container unit toward a bed of a vehicle or the like.

FIG. 7 is a fragmentary sectional view similar to FIG. 6, and drawn on substantially the same scale as FIGS. 5 and 6, and illustrating the locking device in a locked position.

FIG. 8 is a sectional view taken substantially on line 8—8 of FIG. 7 and drawn on substantially the same scale as FIGS. 5-7.

FIG. 9 is a perspective view, drawn on a smaller scale than FIGS. 4, 5, 6, 7 and 8, showing a hazardous solid waste container unit of this invention.

SUMMARY OF THE INVENTION

This invention provides structure and a method for handling hazardous waste materials, which may be liquid waste materials or solid waste materials.

The structure of this invention comprises a hazardous waste container unit which includes a container and a frame which encompasses the container. The frame of the hazardous waste container unit is provided with means by which a hoist mechanism can engage the frame for lifting the hazardous waste container unit. The frame of the hazardous waste container unit is also provided with feet which include means for quickly locking the feet to a load support bed of a carrier vehicle for transport of the hazardous waste container unit, as the hazardous waste container unit rests upon the load support bed of the carrier vehicle.

The method of this invention includes the use of hazardous waste container units which are placed upon a carrier vehicle and transported upon a carrier vehicle to and from a hazardous waste generation site.

The method includes transportation of empty hazardous waste container units to a hazardous waste generation site. The method also includes removal of filled hazardous waste container units from a generation site and transporting the filled hazardous waste container units to a holding site at which the hazardous waste container units are emptied and cleaned for further use.

DETAILED DESCRIPTION OF THE INVENTION

Figure 1:
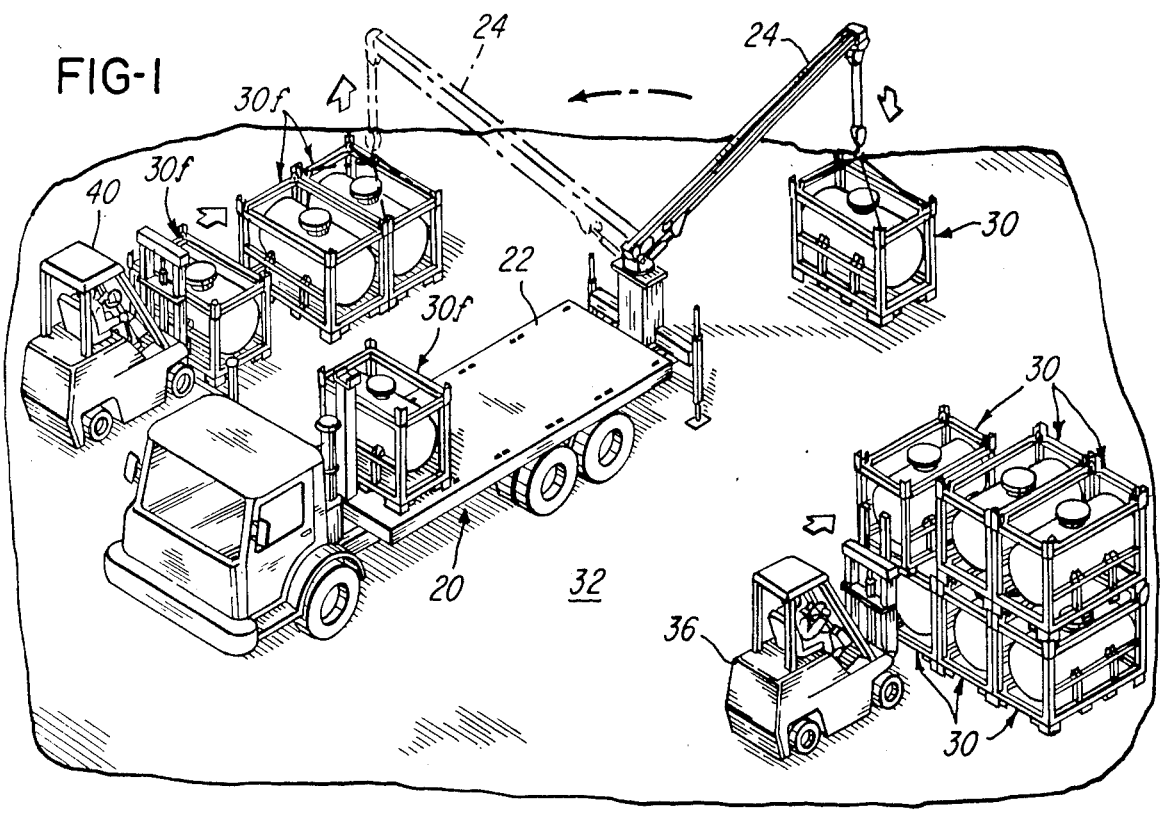
FIG. 1 is a perspective illustrative view showing hazardous liquid waste container units which are constructed according to this invention and showing a process of this invention for transferring empty hazardous waste container units from a carrier vehicle to a generation site. This view also illustrates a method for removal of filled hazardous waste container units from the generation site.

FIG. 1 illustrates a portion of a method of this invention which employs a carrier or transport vehicle 20. The carrier vehicle 20 has a load support bed 22 and a pivotally movable boom 24. As illustrated in FIG. 1, empty hazardous liquid waste container units 30 are removed from the load support bed 22 of the vehicle 20 and set upon a surface 32, such as the ground or the like. A fork lift vehicle 36 is shown in FIG. 1 in the process of positioning and stacking the empty hazardous waste container units 30.

FIG. 1 also shows a fork lift vehicle 40 in the process of placing full hazardous waste container units 30f in a position adjacent the transport vehicle 20 so that the full hazardous waste container units 30f may be lifted by the boom 24 and placed upon the load support bed 22 of the transport vehicle 20.

Figure 2:
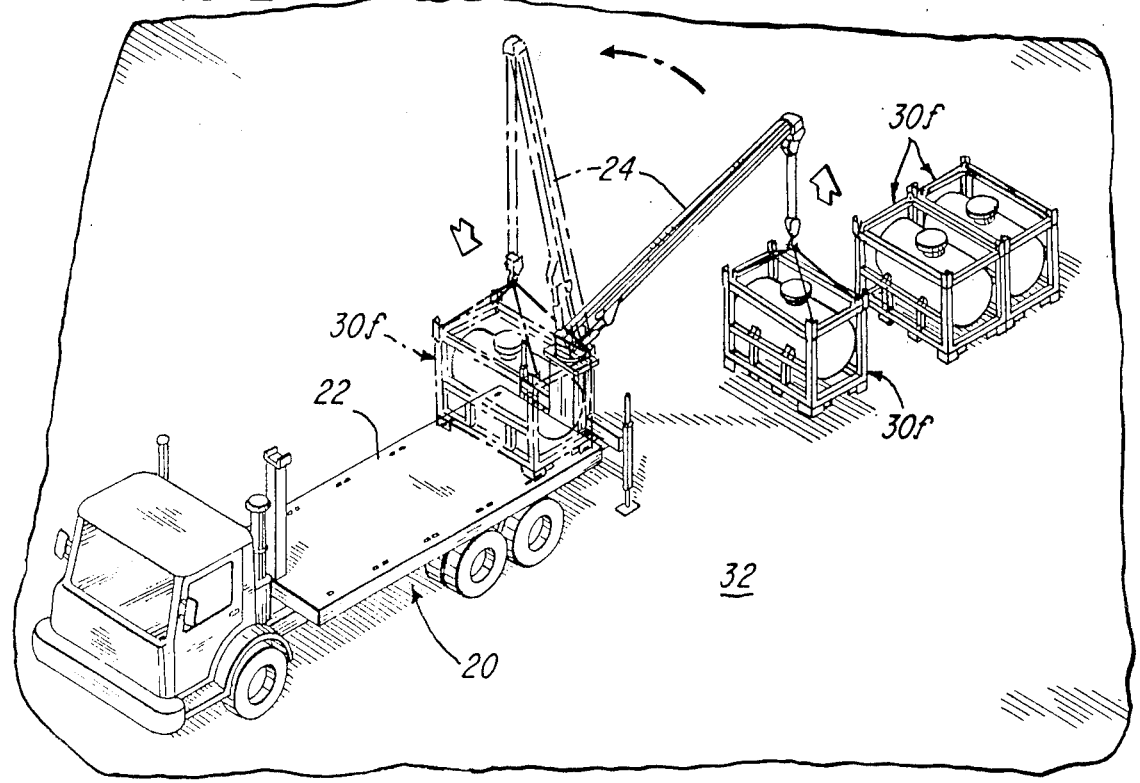
FIG. 2 is a perspective view further illustrating the process of removing filled hazardous waste container units from a generation site by the use of the carrier vehicle.

FIG. 2 illustrates in greater detail the step in the process by which full hazardous liquid waste container units 30f are lifted by the boom 24 and placed upon the load support bed 22 of the transport vehicle 20. The transport vehicle 20 then travels from the generation site to an intermediate site.

Figure 3:
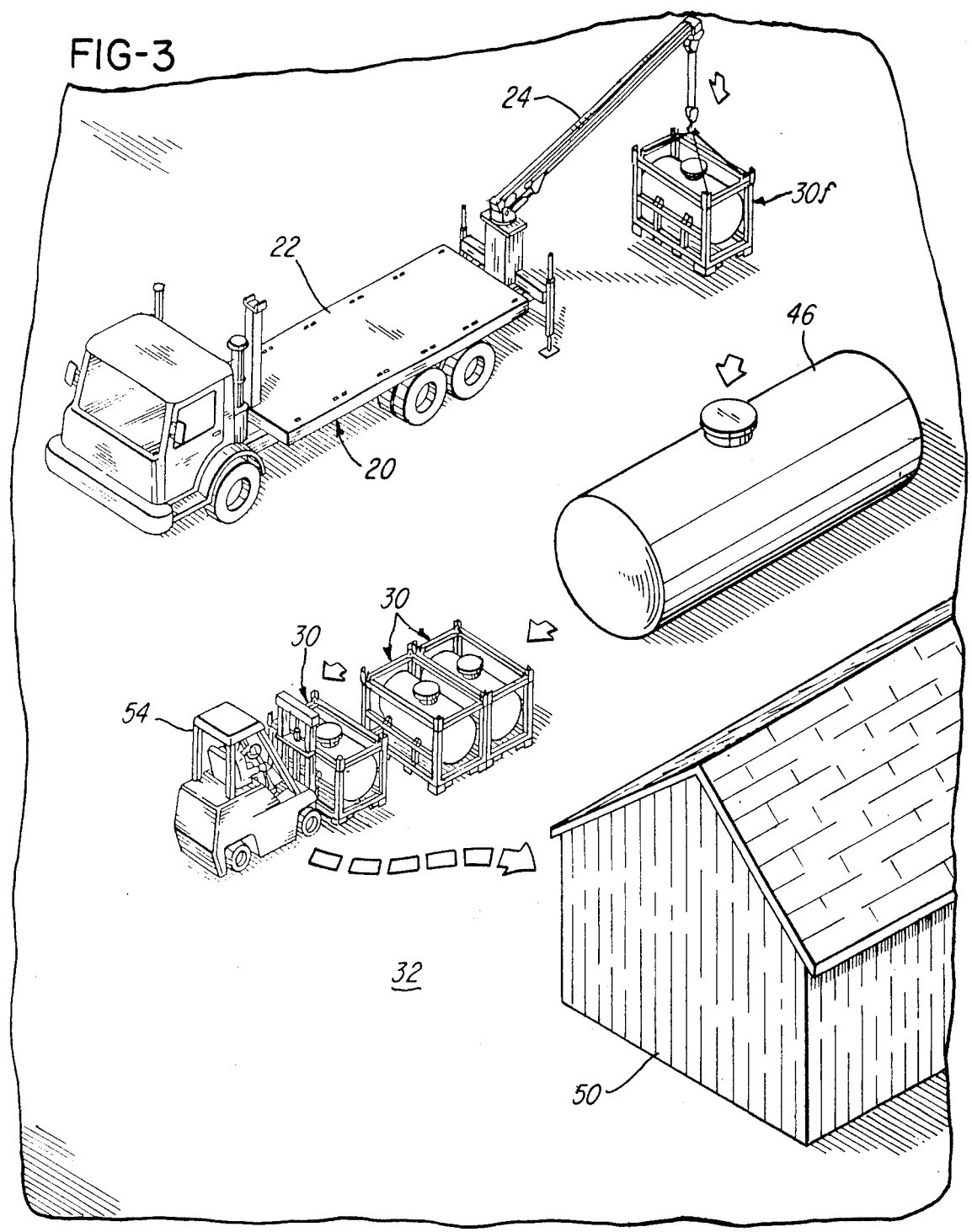
FIG. 3 is a perspective illustrative view showing a hazardous waste receiving site and showing removal of filled hazardous liquid waste container units from a carrier vehicle for transferring the hazardous liquid wastes from the hazardous liquid waste container units to a relatively large holding tank. This figure also illustrates the process of transferring the hazardous liquid waste container units when empty to a location in which the hazardous liquid waste container units are cleaned for reuse.

FIG. 3 shows an intermediate site and illustrates the step in the process by which full hazardous waste container units 30f are removed from the transport vehicle 20 by means of the boom 24, and the contents of the hazardous waste container units 30f are emptied into a holding tank 46. FIG. 3 also illustrates moving the empty hazardous waste container units 30 into a building 50 in which the empty hazardous waste container units 30 are cleaned and readied for further use. A fork lift vehicle 54 is shown as the carrier of the empty hazardous waste container units 30f into the building 50.

FIG. 4 illustrates the details of a preferred hazardous liquid waste container unit 30 of this invention. The container unit 30 includes a container 60 which is retained within a frame 62. The container 60 has an upper neck portion 64 forming an opening which is closed by a cover 66.

Lifting rings 68 are attached to the frame 62 at the upper portion thereof and are adapted to be engaged by hoist elements for lifting the hazardous waste container unit 30.

Attached to the frame 62 at the lower portion thereof are feet 70, each of which is provided with a bottom opening 72 and a side opening 74. The feet 70 are adapted to be positioned upon the load support bed 22 of a transport vehicle, such as the transport vehicle 20. The feet 70 are also employed in stacking of container units 30 in the manner illustrated in FIG. 1. The upper portions of the frame 62 are adapted to receive and support the feet 70.

FIGS. 5, 6, 7 and 8 show in detail means by which the feet 70 of a hazardous waste container unit 30 are locked to the bed 22 of the transport vehicle 20. These figures show a bracket 80 attached to the lower part of the bed 22. There is one bracket 80 for each of the feet 70 of the container units 30 to be positioned upon the load support bed 22. The bracket 80 has a housing 82 attached thereto. The housing 82 has a portion 82 which is located below the surface of the bed 22 and a portion above the surface of the bed 22. The housing 82 rotatably supports a vertical shaft 84. The shaft 84 has a head 86 at the upper end thereof. The head 86 has a transverse portion which is elongate in shape. A handle 88 is attached to the lower end of the shaft 84. When a hazardous waste container unit 30 is positioned upon the load support bed 22, the opening 72 in each of the feet 70 of the frame 62 of the hazardous waste container unit 30 encompasses the portion of a housing 82 which is above the surface of the bed 22. Then the shaft 84 is moved upwardly by the handle 88, and the head 86 is moved through the opening 72 in the foot 70. Then by means of the handle 88 the shaft 84 and the head 86 are rotated 90 degrees. Thus, the head 86 is locked within the foot 70, as illustrated in FIGS. 7 and 8. Thus, a hazardous waste container unit 30 is locked upon the bed 22.

FIG. 9 shows a hazardous solid waste material container unit 100 of this invention. The container unit 100 includes a container 104 within a frame 106. The frame 106 is preferably the same construction as the frame 62 shown in FIG. 4, with lift rings 110 and feet 120. The container 104 is shown as having a cover 130.

A solid waste material container unit 100 may be handled in a manner similar to that described above with regard to the liquid waste container unit 30.

Although the preferred embodiment of the structure and method of this invention have been described, it will be understood that within the purview of this invention various changes may be made in the structure and/or method of this invention and/or in the form, details, proportion and arrangement of parts of the structure of this invention which generally stated consist in a method and/or structure within the scope of the appended claims.

The invention having thus been described, the following is claimed.

1. The method of processing hazardous waste materials comprising:
   placing a hazardous waste container unit upon a transport vehicle, the hazardous waste container unit including a hazardous waste container,
   attaching the hazardous waste container unit to the transport vehicle,
   transporting the hazardous waste container unit to a hazardous waste generation site,
   releasing the hazardous waste container unit from attachment to the transport vehicle,
   removing the hazardous waste container unit from the transport vehicle,
   positioning the hazardous waste container unit at a hazardous waste generation site at which hazardous waste materials are generated,
   placing hazardous waste materials into the hazardous waste container of the hazardous waste container unit at the hazardous waste generation site,
   placing the hazardous waste container unit having hazardous waste materials in the hazardous waste container thereof upon a transport vehicle,
   attaching the hazardous waste container unit to the transport vehicle,
   transporting the hazardous waste container unit with hazardous waste materials in the hazardous waste container thereof to a hazardous waste materials collection site having a hazardous waste material collection receiver,
   releasing the hazardous waste container unit from attachment to the transport vehicle,
   emptying the hazardous waste container of the hazardous waste container unit into the hazardous waste material collection receiver,
   and cleaning the hazardous liquid waste container unit including the hazardous waste container thereof for transportation to a hazardous waste generation site for reuse of the hazardous waste container unit.

2. The method of claim 1 in which the hazardous waste container is adapted to receive liquid hazardous waste materials, and liquid hazardous waste materials are placed into the hazardous waste container of the hazardous waste container unit.

3. The method of claim 1 in which the hazardous waste container is adapted to receive solid hazardous waste materials, and solid hazardous waste materials are placed into the hazardous waste container of the hazardous waste container unit.

4. A hazardous waste container unit for containing and transporting hazardous waste materials, the hazardous waste container unit being adapted for support by a support surface comprising:
 a rigid container,
 a rigid frame structure closely encompassing the rigid container, the rigid frame structure including lift means for lifting the hazardous waste container unit, the rigid frame structure also including a plurality of feet members for support of the hazardous waste container unit upon a support surface, the feet members including attachment means for attaching the rigid frame structure of the hazardous waste container unit to a support surface.

5. The hazardous waste container unit of claim 4 in which the container unit is adapted to be supported upon a support surface which comprises a load support bed of a vehicle and which includes locking means carried by the load support bed of the vehicle, the locking means including a shaft, and an elongate head attached to the shaft and normal to the shaft, the attachment means of the feet members including receptacle means for receipt of the head for attaching the shaft to one of the feet members.

6. The hazardous waste container unit of claim 4 in which the rigid container comprises a tank having a cylindrical body portion and adapted for containing liquid hazardous waste materials.

7. The hazardous waste container unit of claim 4 in which the rigid container comprises a tank having a rectangular body portion adapted for containing solid hazardous waste materials.

8. A method of handling hazardous waste materials comprising:
 placing an empty hazardous waste container unit upon a transport vehicle,
 transporting the empty hazardous waste container unit to a hazardous waste generation site,
 removing the empty hazardous waste container unit from the transport vehicle and positioning the empty hazardous waste container unit at the hazardous waste generation site for receipt of hazardous waste materials,
 placing hazardous waste materials into the hazardous waste container unit at the hazardous waste collection site,
 removing from the hazardous waste generation site the hazardous waste container unit which contains hazardous waste materials,
 transporting the hazardous waste container unit which contains hazardous waste materials upon a transport vehicle to a hazardous waste accumulation site at which hazardous waste materials are accumulated,
 removing the hazardous waste container unit from the transport vehicle at the accumulation site,
 removing the hazardous waste materials from the hazardous waste container unit at the accumulation site,
 and cleaning the hazardous waste container unit for transport of the hazardous waste container unit to a hazardous waste generation site.

9. The method of claim 8 in which each of the hazardous waste container units comprises a rigid container, a rigid frame closely encompassing the rigid container, the rigid frame including lift elements by which the rigid frame can be engaged for lifting, and for placing the hazardous waste container unit upon a transport vehicle for transport by the transport vehicle, and in which the rigid frame includes feet members which include securing means for securing the frame of the hazardous waste container unit to the transport vehicle for transportation of the hazardous waste container units by the transport vehicle.

* * * * *